(12) United States Patent
Nasu et al.

(10) Patent No.: US 11,248,713 B2
(45) Date of Patent: Feb. 15, 2022

(54) BUTTERFLY VALVE

(71) Applicant: ASAHI YUKIZAI CORPORATION, Nobeoka (JP)

(72) Inventors: Takashi Nasu, Nobeoka (JP); Shinobu Kamimura, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 0 days.

(21) Appl. No.: 16/960,644

(22) PCT Filed: Jan. 8, 2019

(86) PCT No.: PCT/JP2019/000232
§ 371 (c)(1),
(2) Date: Jul. 8, 2020

(87) PCT Pub. No.: WO2019/139006
PCT Pub. Date: Jul. 18, 2019

(65) Prior Publication Data
US 2020/0355290 A1    Nov. 12, 2020

(30) Foreign Application Priority Data
Jan. 10, 2018 (JP) .............................. JP2018-001831

(51) Int. Cl.
*F16K 27/02* (2006.01)
*F16K 1/226* (2006.01)
(Continued)

(52) U.S. Cl.
CPC ........ *F16K 27/0218* (2013.01); *F16K 1/2263* (2013.01); *F16K 1/2261* (2013.01); *F16K 1/36* (2013.01); *F16K 1/42* (2013.01)

(58) Field of Classification Search
CPC ...... F16K 27/0218; F16K 1/42; F16K 1/2263; F16K 1/2261
See application file for complete search history.

(56) References Cited

U.S. PATENT DOCUMENTS 4,519,579 A    5/1985  Brestel et al.
4,676,481 A    6/1987  Hayes
(Continued)

FOREIGN PATENT DOCUMENTS

CN    101163911 A    4/2008
CN    201661695 U    12/2010
(Continued)

OTHER PUBLICATIONS

PCT/ISA/210, "International Search Report for International Application No. PCT/JP2019/000232," dated Mar. 26, 2019.
(Continued)

*Primary Examiner* — Kevin L Lee
(74) *Attorney, Agent, or Firm* — Manabu Kanesaka

(57) ABSTRACT

A butterfly valve includes a valve body with an internal flow passage extending in a direction of a flow passage axis, a disk-shaped valve member supported in the internal flow passage rotatably about a rotation axis perpendicular to the flow passage axis and having a spherical valve seat surface in an outer peripheral portion, an annular recessed portion surrounding the internal flow passage on the side surface of the valve body in a direction of the flow passage axis, and a seat ring attached to the annular recessed portion such that a valve seat portion provided in an inner peripheral edge portion thereof projects into the inner flow passage. The valve seat portion has a triangular cross section and is formed such that a bisector of a vertex angle in the triangular cross section of valve seat portion is perpendicular to a tangential line to the valve seat surface.

12 Claims, 10 Drawing Sheets

(51) Int. Cl.
*F16K 1/36* (2006.01)
*F16K 1/42* (2006.01)

(56) References Cited

U.S. PATENT DOCUMENTS

| | | | |
|---|---|---|---|
| 8,714,521 B2 | 5/2014 | Nelson et al. | |
| 11,054,042 B2* | 7/2021 | Nasu et al. | F16K 1/2261 |
| 2017/0299065 A1 | 10/2017 | Miyashita et al. | |
| 2020/0072360 A1* | 3/2020 | Xie | F16K 5/0684 |

FOREIGN PATENT DOCUMENTS

| | | |
|---|---|---|
| CN | 102141156 A | 8/2011 |
| EP | 0020239 A1 | 12/1980 |
| EP | 0116530 A1 | 8/1984 |
| EP | 2336612 A2 | 6/2011 |
| FR | 2882586 A1 | 9/2006 |
| GB | 1202470 A | 8/1970 |
| JP | S60-2061 U | 1/1985 |
| JP | S62-2074 A | 1/1987 |
| JP | 2004-169845 A | 6/2004 |
| JP | 2006-234169 A | 9/2006 |
| JP | 2017-160971 A | 9/2017 |
| JP | 2017-180742 A | 10/2017 |
| JP | 2017-190814 A | 10/2017 |
| WO | 2006/118097 A1 | 11/2006 |
| WO | 2009/008061 A1 | 1/2009 |
| WO | 2016/056535 A1 | 4/2016 |

OTHER PUBLICATIONS

Europe Patent Office, "Search Report for European Patent Application No. 19738505.7," dated Aug. 16, 2021.
China National Intellectual Property Administration, "Search Report for Chinese Patent Application No. 201980007283.3," dated Nov. 12, 2021.

* cited by examiner

BUTTERFLY VALVE

RELATED APPLICATIONS

The present application is National Phase of International Application No. PCT/JP2019/000232 filed Jan. 8, 2019, and claims priority from Japanese Application No. 2018-001831, filed Jan. 10, 2018, the disclosure of which is hereby incorporated by reference herein in its entirety.

TECHNICAL FIELD

The present invention relates to a butterfly valve, which is used for fluid transport piping lines in various industries, opening and closing a flow passage by rotating a valve member.

BACKGROUND ART

In various industries, such as a chemical factory, a semiconductor manufacturing field, a food field, and a biotechnology field, a butterfly valve is used for opening and closing or controlling a flow passage through which various kinds of fluid flow. In the butterfly valve, a disk-shaped valve member rotatably supported by a valve body with a valve stem is disposed in a tubular internal flow passage formed in the valve body. The valve stem is rotated by a handle or an actuator connected to the valve stem and a valve member valve seat surface of an outer peripheral edge portion of the valve member is brought into and out of contact with a valve seat portion of an annular sheet member provided between the inner peripheral surface of the internal flow passage or the valve body and the outer peripheral edge portion of the valve member, thus opening and closing the flow passage.

As a butterfly valve, a double eccentric butterfly valve is present in which a rotation axis of a valve stem is located eccentrically in a direction of a flow passage axis from a center of a sealing plane formed when a valve seat portion of a sheet member and a valve member valve seat surface of a valve body abut against each other and is located eccentrically from a center of an internal flow passage. In such a double eccentric butterfly valve, the valve member valve seat surface of the valve member is formed into a spherical shape (shaped to form a part of the spherical surface) and the annular sheet member is attached to an annular recessed portion formed so as to surround the internal flow passage on the side surface of the valve member in the direction of the flow passage axis, and then the spherical valve member valve seat surface of the valve member is brought into pressure contact with the valve seat portion formed in an inner peripheral edge portion of the sheet member to define a sealing plane, so that a space between an outer peripheral edge portion of the valve member and an inner peripheral surface of the internal flow passage is sealed, thereby resulting in a valve closed state. As with the butterfly valve disclosed in PTL1 or PTL2, an annular valve seat sheet includes a fixing portion provided in an outer peripheral edge portion thereof and a sealing portion provided in an inner peripheral edge portion thereof and having a convex curved surface. The fixing portion is pressed against a receiving portion provided in the valve body and fixed by a retainer or the fixing portion is inserted into and fixed to a closed annular groove provided in the valve body, so that the valve seat sheet is fixed to the valve body with the sealing portion projecting into the internal flow passage in a direction perpendicular to the flow passage axis.

CITATION LIST

Patent Literature

PTL1: Japanese Unexamined Patent Publication No. 2004-169845
PTL2: Japanese Unexamined Patent Publication No. 2006-234169

SUMMARY OF THE INVENTION

Technical Problem

As described above, the double eccentric butterfly valve is configured so that the spherical valve member valve seat surface provided in the outer peripheral edge portion of the valve member is made to abut against the valve seat portion having a projecting curved surface in the inner peripheral edge portion of the sheet member fixed to the valve body to press and deform the sheet member, so that a space between the outer peripheral edge portion of the valve member and the inner peripheral surface of the internal flow passage is sealed. Therefore, in order to increase a surface pressure to improve the sealing performance when the valve member valve seat surface of the valve member is brought into pressure contact with the valve seat portion of the sheet member, there is a necessity of increasing the projection amount into the internal flow passage of the valve seat portion of the sheet member to increase the deformation amount of the valve seat portion. However, the increase in the projection amount of the valve seat portion into the internal flow passage has posed problems that the valve seat portion is pushed by the spherical valve member valve seat surface to become easy to tilt, so that wear of the valve seat portion or breakage, such as partial tearing-off, of the valve seat portion is likely to occur.

Accordingly, it is an object of the present invention to solve the problems existing in the prior art and provide a butterfly valve capable of improving a sealing performance between a seat ring and a valve member and suppressing occurrence of wear or breakage of the seat ring.

Solution to Problem

In view of the above-described object, the present invention provides a butterfly valve including a valve body formed therein with an internal flow passage extending in a direction of a flow passage axis, a disk-shaped valve member supported in the internal flow passage to be rotatable about a rotation axis perpendicular to the flow passage axis and having a spherical valve seat surface in an outer peripheral portion, an annular recessed portion formed so as to surround the internal flow passage on the side surface of the valve body in a direction of the flow passage axis, and an annular seat ring having a valve seat portion in an inner peripheral edge portion thereof and attached to the annular recessed portion such that the valve seat portion projects into the internal flow passage, the internal flow passage being opened and closed by rotating the valve member to bring the valve seat surface into and out of contact with the valve seat portion of the seat ring, in which the valve seat portion has a triangular cross section and is formed such that a bisector of a vertex angle in the triangular cross section of valve seat portion is perpendicular to a tangential line to the valve seat surface at a point where a vertex of the valve seat portion and the valve seat surface abut against each other.

In the above-described butterfly valve, the valve seat portion of the seat ring projecting into the internal flow passage has the triangular cross section and is formed such that the bisector of the vertex angle in the triangular cross section of the valve seat portion is perpendicular to the tangential line to the spherical valve seat surface at the point where the vertex of the valve seat portion and the valve seat surface abut on each other. Hence, the deformation of the valve seat portion can be reduced when the valve seat surface of the valve member is brought into pressure contact with the valve seat portion of the seat ring, and thus occurrence of wear or breakage can be suppressed. Moreover, the valve seat portion perpendicularly (in a normal direction) applies force to the valve member valve seat surface, and therefore the surface pressure is increased and the sealing performance is also improved.

It is preferable that the butterfly valve further includes a retainer cap and a retainer body and the annular recessed portion has a recessed portion wall surface extending perpendicularly to the flow passage axis, the seat ring being held in the annular recessed portion by holding the seat ring between the retainer cap disposed on the recessed portion wall surface and the retainer body fixed to the annular recessed portion such that the valve seat portion projects to the internal flow passage side. In this case, it is more preferable that an inner peripheral surface configured by the surfaces, facing the internal flow passage, of the retainer body and the retainer cap is formed so as to extend in parallel with and apart from the valve seat surface of the valve member in valve closing.

Preferably, the retainer cap includes an annular cap body portion and an annular wall portion projecting and extending in the direction of the flow passage axis from the cap body portion, and the seat ring is held between the retainer cap and the retainer body in a state where the annular wall portion is fitted in an annular fitting groove provided in the seat ring.

In one embodiment, the vertex angle in the triangular cross section of the valve seat portion of the seat ring may be in the range of 110° to 120°.

Further, the retainer cap and the valve body may be integrally formed with each other.

The rotation axis may be set to be located eccentrically in the direction of the flow passage axis from the valve seat surface and located eccentrically from the center of the internal flow passage.

Advantageous Effect of the Invention

According to the butterfly valve of the present invention, by devising the shape of the valve seat portion of the seat ring, the deformation of the valve seat portion can be reduced when the valve seat portion of the seat ring is brought into pressure contact with the valve member valve seat surface of the valve member, result in suppression of occurrence of wear or breakage. Moreover, the valve seat portion perpendicularly applies force to the valve member valve seat surface, and therefore the surface pressure can be increased and the sealing performance is also improved.

DESCRIPTION OF EMBODIMENTS

Figure 1:
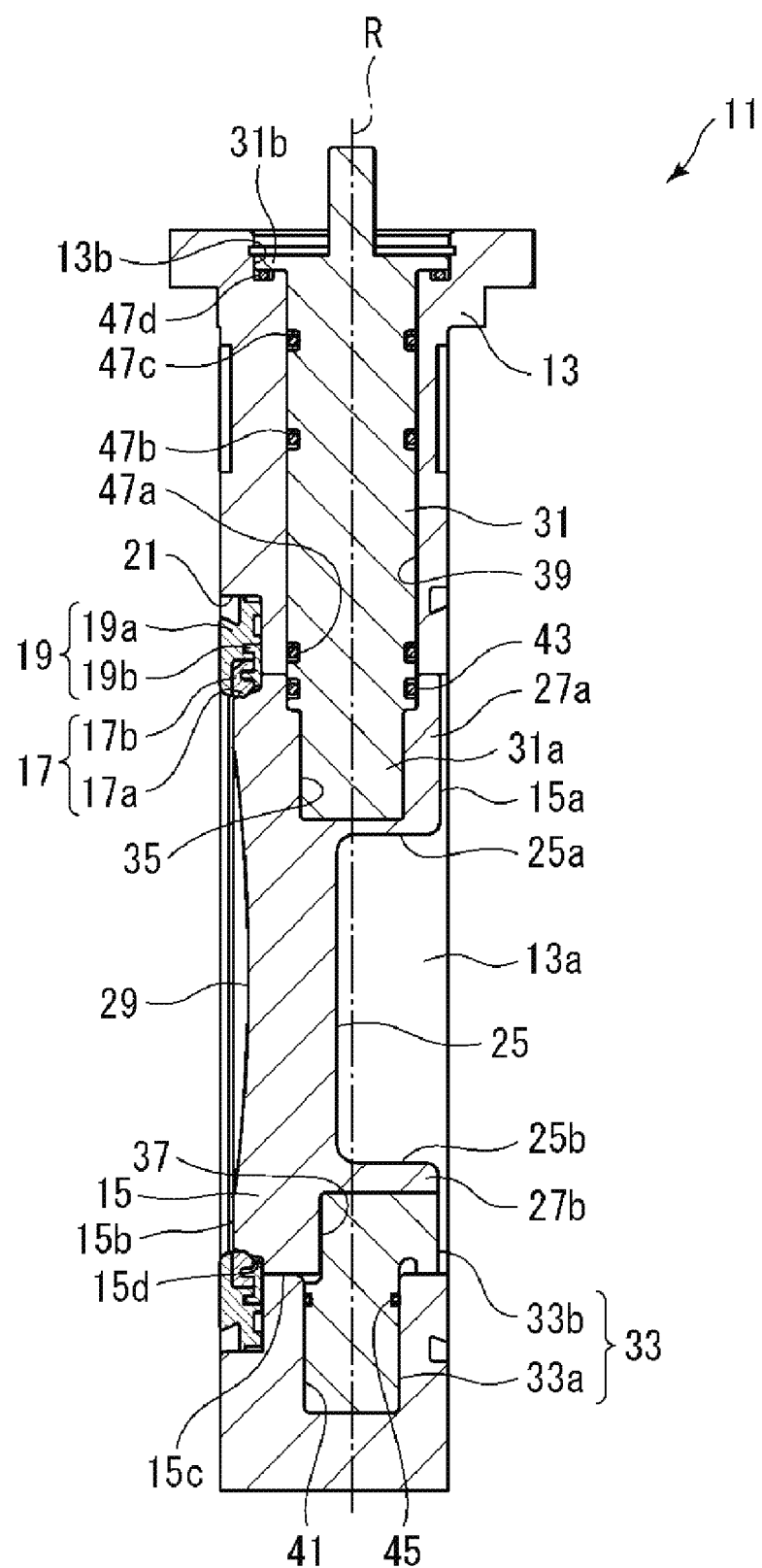
FIG. 1 is a longitudinal cross-sectional view showing the overall configuration of a butterfly valve according to the present invention.

An embodiment of a butterfly valve 11 according to the present invention will be described below with reference to the drawings.

First, an overall configuration of the butterfly valve 11 according to the present invention will be described with reference to FIG. 1 and FIG. 2.

The butterfly valve 11 includes a hollow cylindrical valve body 13 formed therein with an internal flow passage 13a extending in a direction of a flow passage axis, a substantially disk-shaped valve member 15 disposed in the internal flow passage 13a and rotatably supported by the valve body 13, an annular seat ring 17 attached to the inner periphery of the internal flow passage 13a, and an annular seat retainer 19 for fixing the seat ring 17 to the valve body 13 and is configured so that the internal flow passage 13a can be opened and closed by bringing an outer peripheral edge portion of the valve member 15 and a valve seat portion 17a formed on the seat ring 17 into and out of contact with each other.

Figure 7:
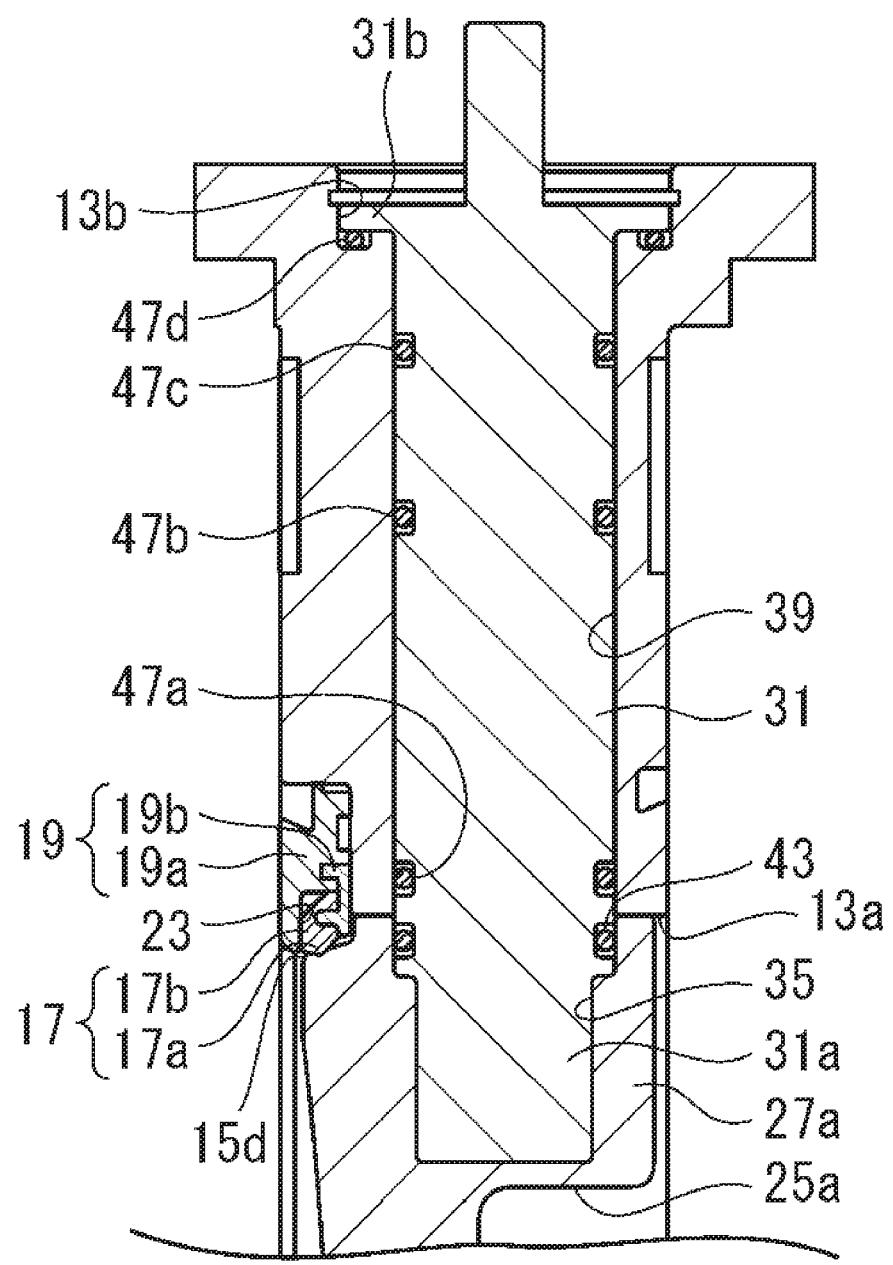
FIG. 7 is a partial longitudinal sectional view of the butterfly valve, showing a first valve stem on the upper side rotatably supporting the valve member of the butterfly valve shown in FIG. 1.

The valve body 13 is provided, in a peripheral edge portion of a downstream end portion of the internal flow passage 13a thereof in the direction of the flow passage axis, i.e., an outer surrounding portion of the internal flow passage 13a in the side surface of the valve body 13 on the downstream side in the direction of the flow passage axis, with an annular recessed portion 21 formed to extend in the radial direction to have substantially the same diameter as that of the outer diameter of the annular seat retainer 19. The seat ring 17 and the seat retainer 19 are fitted into the annular recessed portion 21. The seat retainer 19 includes an annular retainer body 19a and an annular retainer cap 19b. The retainer body 19a is formed to have a step portion 23 (see FIG. 7). The step portion 23 is configured to receive therein a retainer cap 19b and a fixing portion 17b of the seat ring 17 such that the fixing portion 17b of the seat ring 17 is arranged between the retainer cap 19b and the retainer body 19a. Such a configuration makes it possible to fix the retainer body 19a to the annular recessed portion 21 by an appropriate method and hold the fixing portion 17b of the seat ring 17 between the retainer body 19a and the retainer cap 19b arranged on the side surface of the annular recessed portion 21 in the direction of the flow passage axis, so that the seat ring 17 can be held in and fixed to the annular recessed portion 21.

The retainer cap 19b is arranged such that the inner peripheral edge end thereof projects into the internal flow passage 13a. The surfaces of the inner peripheral edge ends of the retainer body 19a and the retainer cap 19b facing the internal flow passage 13a have a shape like a part of a spherical surface.

As a method of fixing the retainer body 19a to the annular recessed portion 21, a bayonet method disclosed in Japanese Unexamined Patent Publication No. H11-230372 can be adopted, for example. In this case, the retainer body 19a is provided, in the outer peripheral surface thereof on the side of the valve body 13, with a plurality of circular arc-shaped projection portions projecting in the radial direction and formed at equal intervals in the circumferential direction, and the annular recessed portion 21 is provided in an outer peripheral portion thereof with circular arc-shaped notch portions formed to be able to receive the circular arc-shaped projection portions and engagement grooves extending from the side of the side surface of the circular arc-shaped notch portions in the direction of the flow passage axis so as to guide the circular arc-shaped projection portions in the circumferential direction. Such a configuration makes it possible fix the retainer body 19a to the annular recessed portion 21, by turning the retainer body 19a in the circumferential direction, in a state where the circular arc-shaped projection portions of the retainer body 19a are fitted into the circular arc-shaped notch portions of the annular recessed portion 21 and then abut on the side surface of the annular recessed portion 21 in the direction of the flow passage axis, and then guiding the circular arc-shaped projection portions along the engagement grooves to engage the circular arc-shaped projection portions with the engagement grooves.

The seat ring 17 is formed of an elastic material and has the valve seat portion 17a and the fixing portion 17b. The valve seat portion 17a is formed to project into the internal flow passage 13a when the seat ring 17 is attached to the annular recessed portion 21 in the state where the fixing portion 17b is held between the retainer body 19a and the retainer cap 19b. Examples of suitable elastic materials forming the seat ring 17 include rubber elastic bodies, such as butyl rubber (BR), chloroprene rubber (CR), ethylene propylene diene rubber (EPDM), and fluororubber (FRM), fluororesin, such as polytetrafluoroethylene (PTFE), and rubber elastic bodies coated with fluororesin, such as PTFE.

Figure 2:
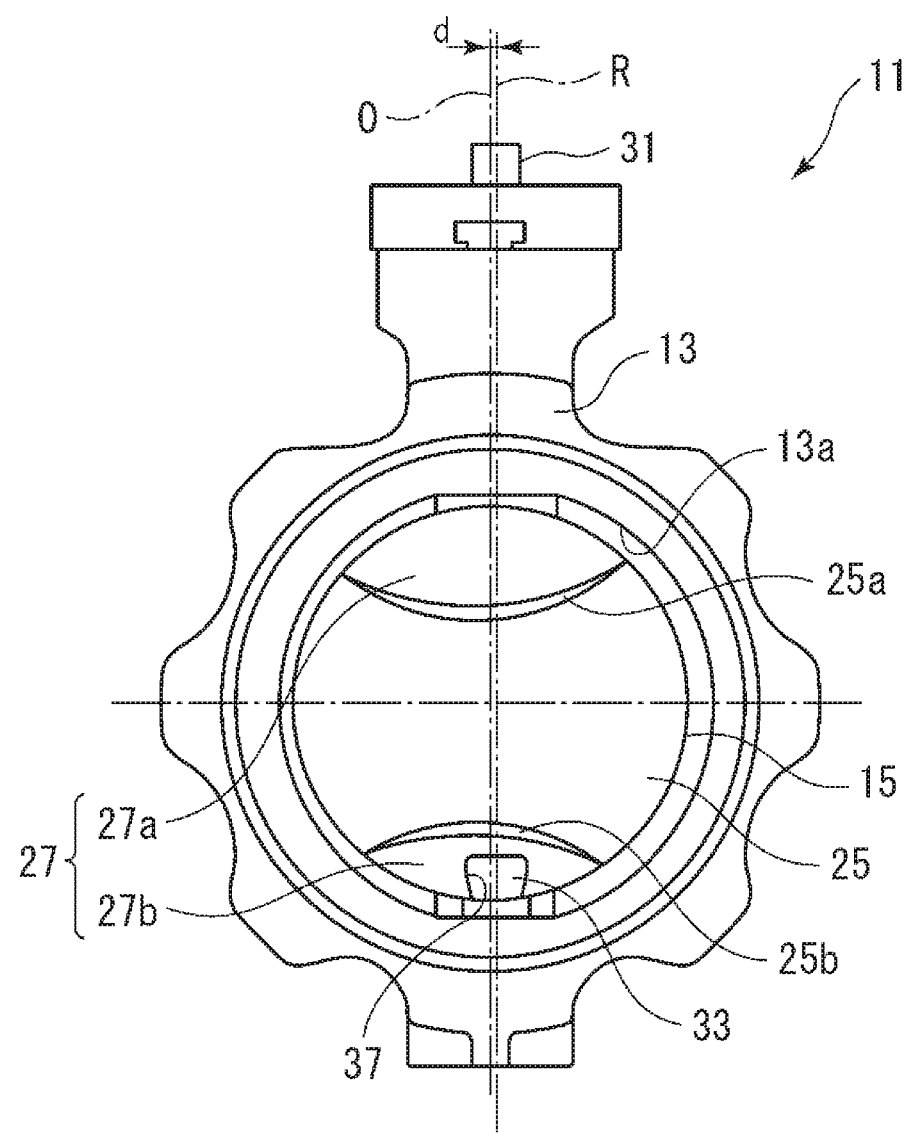
FIG. 2 is a side view of the butterfly valve shown in FIG. 1 as viewed from the right side.
Figure 3:
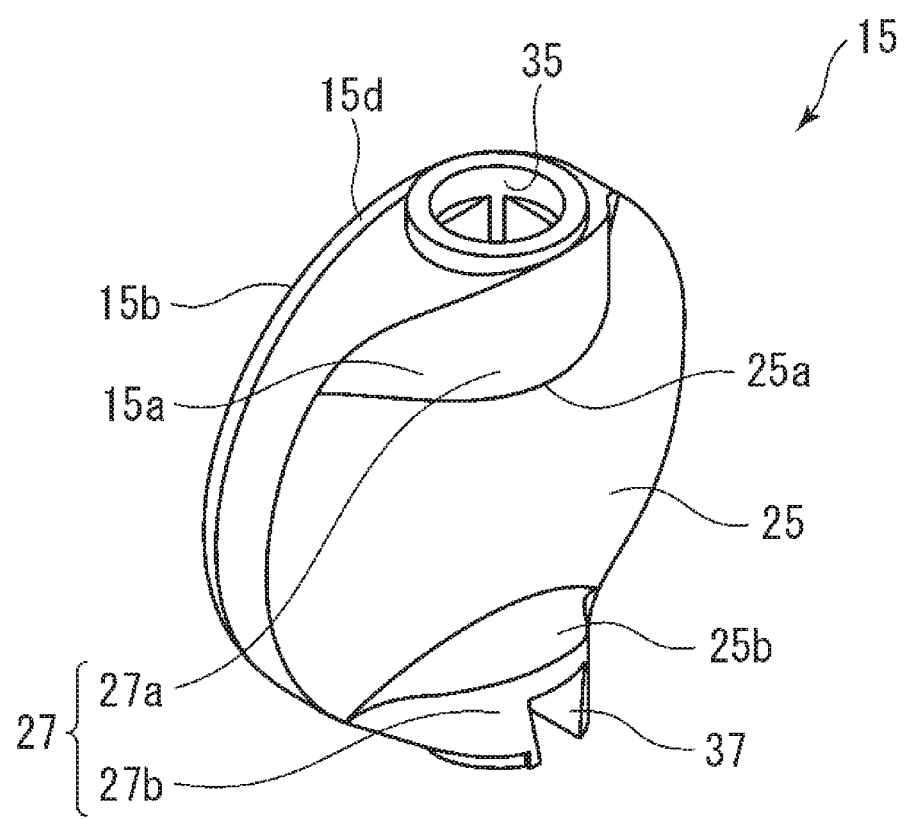
FIG. 3 is a perspective view of a valve member of the butterfly valve shown in FIG. 1.
Figure 4A:
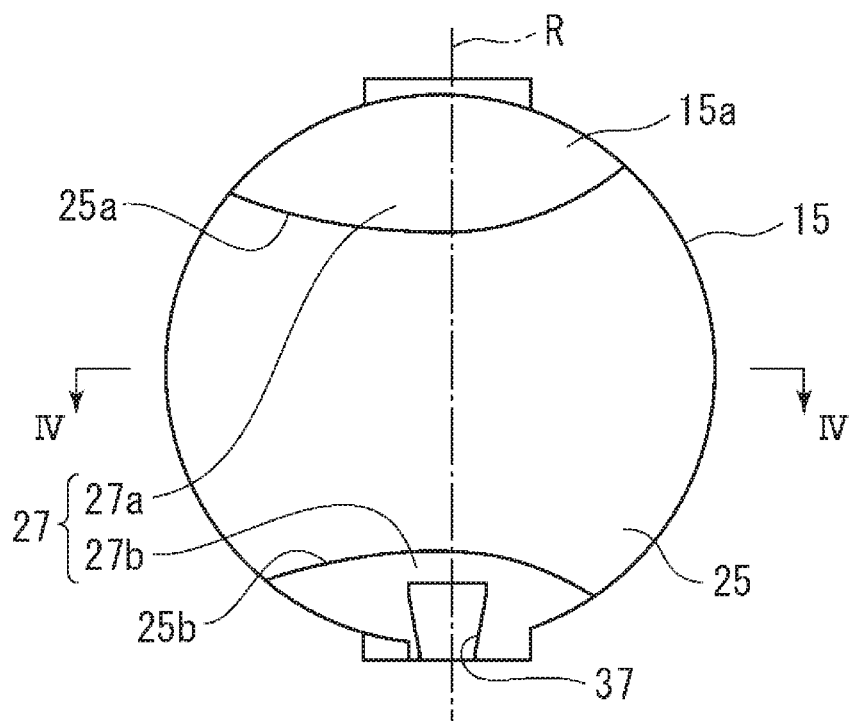
FIG. 4A is a plan view of the valve member shown in FIG. 3 as viewed from the right side in FIG. 1.
Figure 4B:
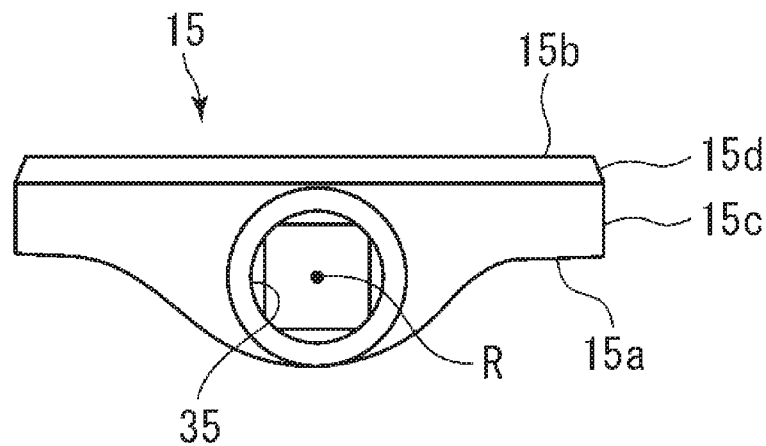
FIG. 4B is a top view of the valve member shown in FIG. 4A as viewed from above in FIG. 4A.
Figure 4C:
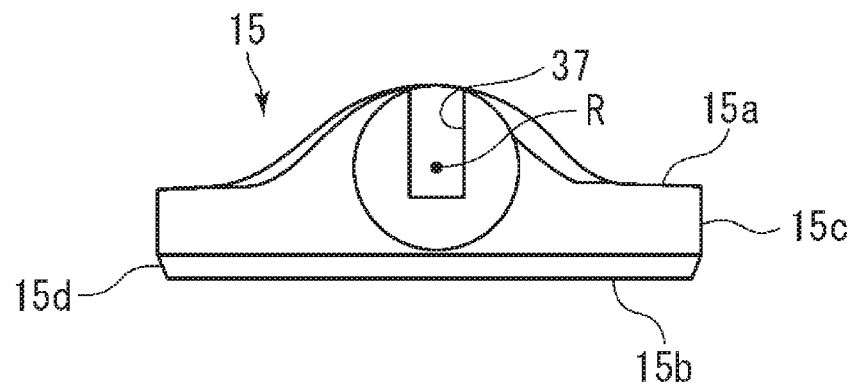
FIG. 4C is a bottom view of the valve member shown in FIG. 4A as viewed from below in FIG. 4A.

The valve member 15 has two principal surfaces 15a, 15b opposite to each other and an outer peripheral edge portion 15c annularly extending so as to connect the two principal surfaces 15a, 15b. The valve member 15 is provided in one principal surface 15a thereof with a groove portion 25 extending therethrough in a direction across (preferably a direction orthogonal to) a rotation axis R, as well shown in FIG. 3. Both side walls 25a, 25b of the groove portion 25 are formed to be convex curved surfaces extending in a convex shape toward the rotation axis R and toward each other as shown in FIG. 2 and FIG. 4A. Due to the formation of the groove portion 25 in the one principal surface 15a of the valve member 15, there are formed outer edge remaining portions 27 (27a, 27b) on both sides in the direction of the rotation axis R across the groove portion 25. The outer edge remaining portions 27 preferably have convex curved surfaces extending in a convex shape in a direction away from the rotation axis R as shown in FIG. 4B and FIG. 4C.

By providing the above-described groove portion 25, when the valve member 15 is rotated to a full open state, the opening area in the internal flow passage 13a is increased by the area of the groove portion 25, so that valve flow coefficient Cv increases. Moreover, the present inventors have found that generation of vortex is suppressed to reduce a pressure loss, by forming both the side walls 25a, 25b of the groove portion 25 as convex curved surfaces mutually extending in the convex shape toward the rotation axis R to be like throttle portions or by forming the outer edge remaining portions 27a, 27b formed on both sides of the groove portion 25 to have the convex curved surfaces extending in the convex shape in the direction away from the rotation axis R. This makes it possible to obtain an effect of improving valve flow coefficient Cv.

Figure 5:
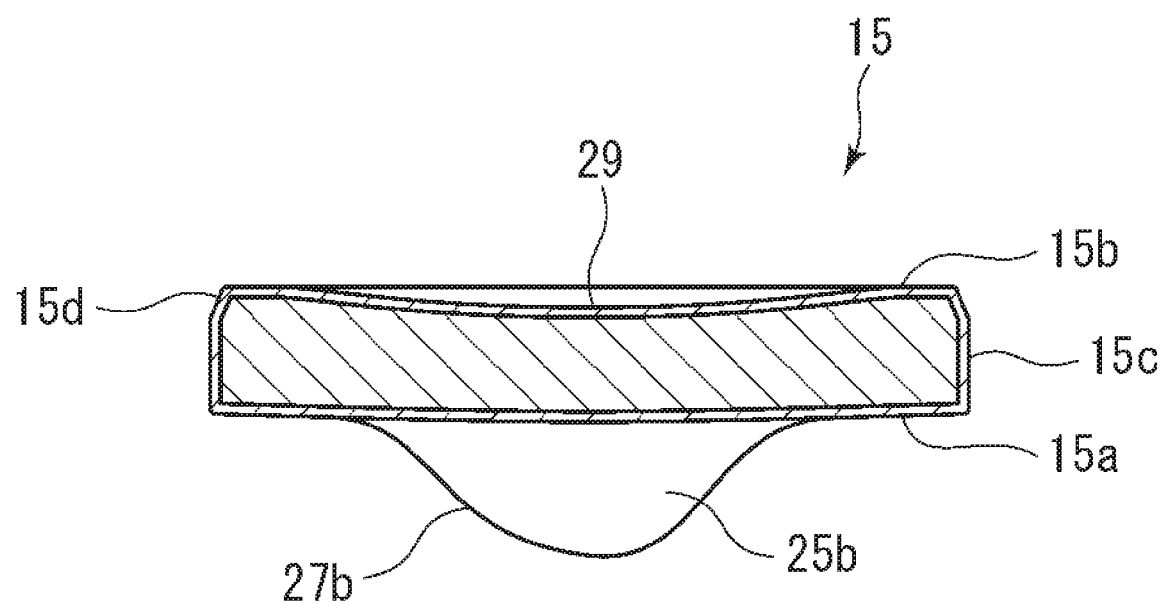
FIG. 5 is a cross-sectional view taken along line IV-IV of FIG. 4A as viewed from above in an arrow direction.

The valve member 15 has a spherical dent portion (hereinafter also referred to as "dimple") 29 formed in a center portion of the other principal surface 15b, as shown in FIG. 5. By providing the spherical dent portion 29, similarly, the generation of vortex is suppressed, so that the effect of improving valve flow coefficient can be obtained due to reduction of pressure loss.

The valve member 15 has a valve member valve seat surface 15d formed in the outer peripheral edge portion 15c thereof. By rotating the valve member 15 about the rotation axis R to press the valve member valve seat surface 15d against the valve seat portion 17a of the seat ring 17, a sealing plane sealing a space between the valve member valve seat surface 15d and the valve seat 17a is defined to close the internal flow passage 13a, thereby resulting in a closed valve state. The valve member valve seat surface 15d has a shape like a part of a spherical surface extending in parallel with and at a distance apart from the spherical surfaces of the inner peripheral edge ends of the retainer body 19a and the retainer cap 19b facing the internal flow passage 13a.

In the butterfly valve 11 of the embodiment shown in the figures, the valve member 15 is rotatably supported by the valve body 13 with a first valve stem 31 and a second valve stem 33 and is provided at positions thereof opposite to each other in the direction of the rotation axis R with a fitting hole 35 for coupling with the first valve stem 31 and an engagement groove 37 for coupling with the second valve stem 33.

The first valve stem 31 is rotatably inserted through and supported in a first stem hole 39 formed in the valve body 13 to extend along the rotation axis R. The second valve stem 33 is inserted into and rotatably supported in a second stem hole 41 formed opposite to the first stem hole 39 across the internal flow passage 13a along the rotation axis R.

The first stem hole 39 is a stem through-hole extending through the valve body 13 from the outside to the internal flow passage 13a in the direction of the rotation axis R. The first valve stem 31 is rotatably inserted through the first stem hole 39 so that both end portions thereof project from the first stem hole 39. One end portion (upper end portion in FIG. 1) of the first valve stem 31 projecting to the outside is configured to allow a handle or a driving unit, not shown, to be attached thereto for operating or driving the valve member 15. The other end portion (lower end portion in FIG. 1) of the first valve stem 31 projecting into the internal flow passage 13a is formed to have a fitting portion 31a of a shape complementary to the fitting hole 35, so that the fitting hole 35 of the valve member 15 and the fitting portion 31a are fitted into each other to be unrotatable about the rotation axis R. For example, by forming the fitting hole 35 of the valve member 15 and the fitting portion 31a of the first valve stem 31 to have polygonal shapes, the fitting hole 35 and the fitting portion 31a can be unrotatably coupled to each other.

Figure 6A:
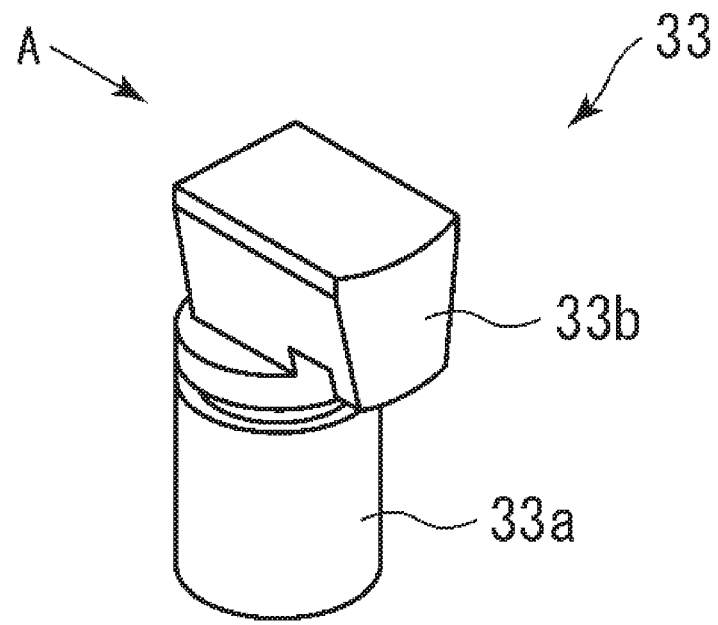
FIG. 6A is a perspective view of a second valve stem on the lower side rotatably supporting the valve member of the butterfly valve shown in FIG. 1.
Figure 6B:
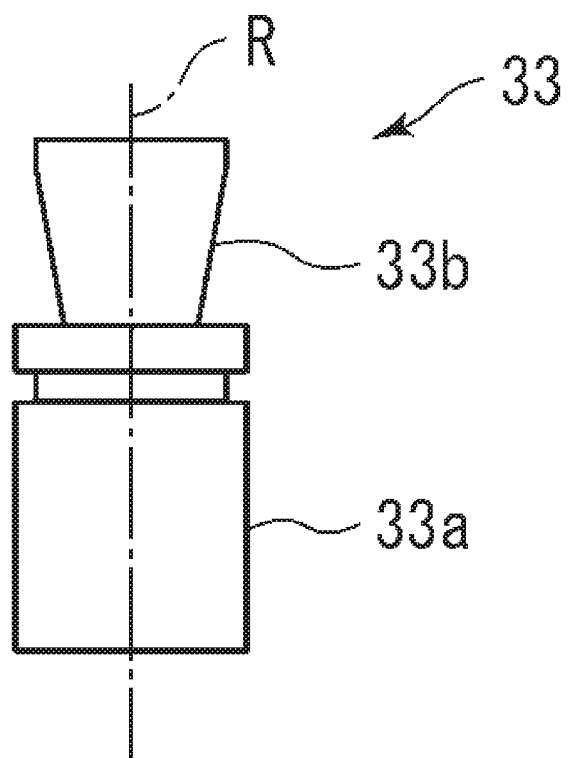
FIG. 6B is a side view of the second valve stem on the lower side rotatably supporting the valve member of the butterfly valve shown in FIG. 1 as viewed from a direction of arrow A.

On the other hand, the second stem hole 41 is a stem bottomed-hole (i.e., non-penetrating stem hole) extending in the direction of the rotation axis R from the internal flow passage 13a of the valve body 13. The second valve stem 33 is inserted into and rotatably supported in the second stem hole 41, so that one end portion thereof projects from the second stem hole 41. The second valve stem 33 includes a stem portion 33a rotatably supported in the second stem hole 41, and an engagement portion 33b which connects to the stem portion 33a and is formed to project from the second stem hole 41. The engagement portion 33b is fitted into the engagement groove 37. In detail, the engagement portion 33b is formed as a rail-like portion extending in a direction perpendicular to the rotation axis R, as shown in FIG. 6A and FIG. 6B, one end of the rail-like portion projects and extends in the direction perpendicular to the rotation axis R from the outer peripheral surface of the stem portion 33a, and the second valve stem 33 has a substantially L shape. The engagement groove 37 of the valve member 15 is formed to have a shape complementary to the rail-like portion as shown in FIG. 4A. The valve member 15 and the second valve stem 33 are coupled to each other to be unrotatable about the rotation axis R by inserting the engagement portion 33b, which is the rail-like portion, into the engagement groove 37 of the valve member 15 in the direction perpendicular to the rotation axis R. The engagement portion 33b, which is the rail-like portion, preferably has a wedge-shaped cross section expanding toward the tip from the root which is a portion connecting to the stem portion 33a. Due to such a wedge shape, the removal of the valve member 15 in the direction of the rotation axis R from the second valve stem 33 can be prevented. However, the cross-sectional shape of the engagement portion 33b is not limited insofar as the valve member 15 and the second valve stem 33 can be unrotatably coupled to each other and may be a polygonal shape, a circular shape, an oval shape, or the like.

As shown in FIG. 1, in order to prevent a fluid in the internal flow passage 13a from entering into the fitting hole 35 or the second stem hole 41 which is a bottomed hole, annular sealing members 43, 45 are disposed in annular grooves provided, on the outer peripheral surfaces of the first valve stem 31 and the stem portion 33a of the second valve stem 33, at positions facing the vicinity of an opening portion into the internal flow passage 13a on the inner peripheral surface of the fitting hole 35 and the vicinity of an opening portion into the internal flow passage 13a on the inner peripheral surface of the second stem hole 41, thereby sealing a space between the inner peripheral surface of the fitting hole 35 and the outer peripheral surface of the first valve stem 31 and a space between the inner peripheral surface of the second stem hole 41 and the outer peripheral surfaces of the stem portion 33a of the second valve stem 33. Further, in order to prevent a fluid in the internal flow passage 13a from flowing out to the outside through the first stem hole 39 which is a stem through-hole, annular sealing members 47a, 47b, 47c formed of a rubber elastic material, such as an O-ring, are disposed in annular grooves provided at a plurality of positions (three places in the embodiment shown in the figures) including a position facing the vicinity of an opening portion of the first stem hole 39 into the internal flow passage 13a on the outer peripheral surface of the first valve stem 31, thereby sealing a space between the inner peripheral surface of the first stem hole 39 and the outer peripheral surface of the first valve stem 31. Furthermore, as shown in detail in FIG. 7, the first valve stem 31 is provided, in the vicinity of an end portion thereof on the side opposite to the fitting portion 31a, with a flange portion 31b, and the valve body 13 is provided, in a portion surrounding an opening portion of the first stem hole 39 to the outside, with an annular recessed portion 13b for receiving therein the flange portion 31b. An annular plane sealing member 47d formed of a rubber elastic material is fitted into an annular groove provided on the surface (hereinafter referred to as a bottom surface) facing the flange portion 31b in the annular recessed portion 13b. The sealing member 47d disposed as described above seals a space between the flange portion 31b and the bottom surface of the annular recessed portion 13b. Thus, even when a fluid in the internal flow passage 13a enters the first stem hole 39, the fluid is prevented from leaking out to the outside from the first stem hole 39. Such a sealing structure is particularly effective when a harmful fluid flows through the internal flow passage 13a.

The butterfly valve 11 of the embodiment shown in the figures is a double eccentric butterfly valve having a double eccentric structure. Referring to FIG. 1 and FIG. 2, in the double eccentric butterfly valve 11, the valve seat portion 17a of the seat ring 17, the valve member valve seat surface 15d, the first valve stem 31, and the second valve stem 33 are provided such that the center, in the direction of the flow passage axis, of the sealing plane defined between the valve member valve seat surface 15d of the valve member 15 and the valve seat portion 17a of the seat ring 17 in valve closing is located eccentrically in the direction of the flow passage axis from the rotation axis R of the valve member 15. Furthermore, as shown in detail in FIG. 2, the first valve stem 31 and the second valve stem 33 are connected to the valve member 15 such that the rotation axis R of the valve member 15 is located away from a center axis O, which extends in parallel to the rotation axis R so as to pass through the center of the cross section of the internal flow passage 13a, by a distance d in the cross section of the internal flow passage 13a. Such a configuration makes it possible to utilize the cam action due to the eccentricity to move the valve member 15 away from the seat ring 17 with a slight angle rotation of the valve member 15 in opening and closing the valve, resulting in a low friction between the seat ring 17 and the valve member 15. Therefore, the wear of the seat ring 17 can be reduced and an operation torque can be decreased.

Moreover, the double eccentric butterfly valve 11 is configured so that the rotation axis R is located eccentrically from the center axis O of the internal flow passage 13a as described above, and therefore the maximum width of the valve member 15 in the direction of the rotation axis R is different between one side and the other side in the radial direction across the rotation axis R. Utilizing this fact, in the double eccentric butterfly valve 11 of the embodiment shown in the figures, the retainer cap 19b is disposed such that the inner peripheral edge end thereof projects into the internal flow passage 13a. Thus, by setting the amount of the projection into the internal flow passage 13a of the retainer cap 19b such that, when the valve member 15 is rotated from a closed valve state into an opened valve state, the valve member 15 can be rotated in one direction about the rotation axis R without making the outer peripheral edge portion 15c interfere with the retainer cap 19b and cannot be rotated in the other direction about the rotation axis R because of the outer peripheral edge portion 15c interfering with the retainer cap 19b, the rotating direction of the valve member 15 from a fully closed state can be restricted.

The valve body 13, the valve member 15, the seat retainer 19, the first valve stem 31, and the second valve stem 33 can be formed of metal materials, resin materials, metal materials coated with resin materials, metal materials formed by insert molding according to an injection molding method, and the like, depending on the intended use.

Next, a method for assembling the butterfly valve 11 will be described with reference to FIG. 8A to FIG. 8E.

Figure 8A:
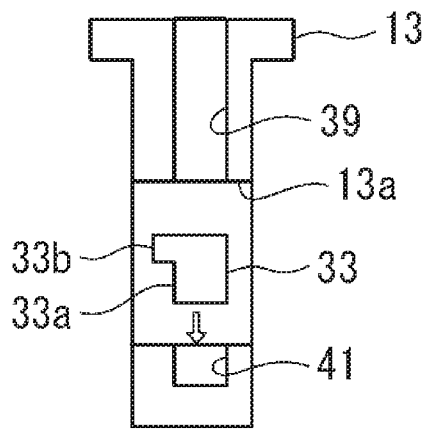
FIG. 8A is an explanatory view illustrating an assembling procedure of a valve body and the valve member of the butterfly valve shown in FIG. 1.

First, as shown in FIG. 8A, the stem portion 33a of the second valve stem 33 is rotatably inserted into the second stem hole 41 of the valve body 13. At this time, the second valve stem 33 is disposed such that the rail-like portion of the engagement portion 33b of the second valve stem 33 extends in the direction of the flow passage axis and the side projecting in the direction perpendicular to the rotation axis R from the peripheral surface of the stem portion 33a is directed to the mounting side (annular recessed portion 21 side) of the seat ring 17.

Figure 8B:
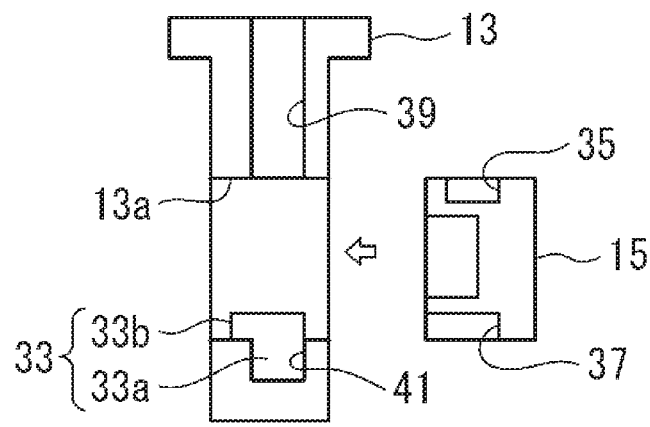
FIG. 8B is an explanatory view illustrating an assembling procedure of the valve body and the valve member of the butterfly valve shown in FIG. 1.
Figure 8C:
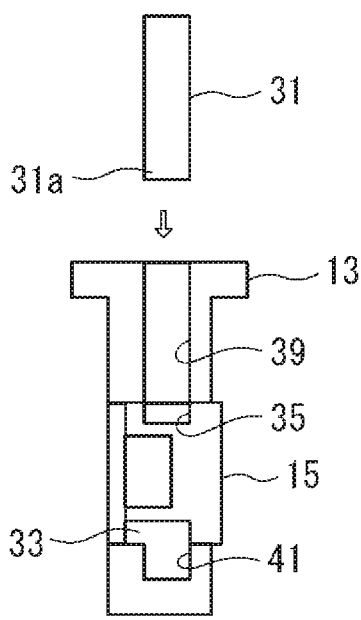
FIG. 8C is an explanatory view illustrating an assembling procedure of the valve body and the valve member of the butterfly valve shown in FIG. 1.

Next, as shown in FIG. 8B, the valve member 15 is inserted into the internal flow passage 13a of the valve body 13 in the direction of the flow passage axis from the side of the valve body 13 opposite to the annular recessed portion 21 in the direction of the flow passage axis, in a state where the engagement groove 37 of the valve member 15 is directed to the valve body 13 side, so that the engagement portion 33b of the second valve stem 33 and the engagement groove 37 of the valve member 15 are fitted into each other and the engagement portion 33b is received in the engagement groove 37 until the engagement portion 33b reaches an end portion of the engagement groove 37. As shown in FIG. 8C, the first valve stem 31 is then inserted into the first stem hole 39, so that the fitting portion 31a of the first valve stem 31 is unrotatably fitted into the fitting hole 35 of the valve member 15. Thus, the valve member 15 is supported in the internal flow passage 13a of the valve body 13 to be rotatable about the rotation axis R.

By inserting the valve member 15 into the internal flow passage 13a in the state where the second valve stem 33 is disposed in the direction described above, the valve member 15 can be inserted from the side close to the second valve stem 33, which facilitates the work.

Figure 8D:
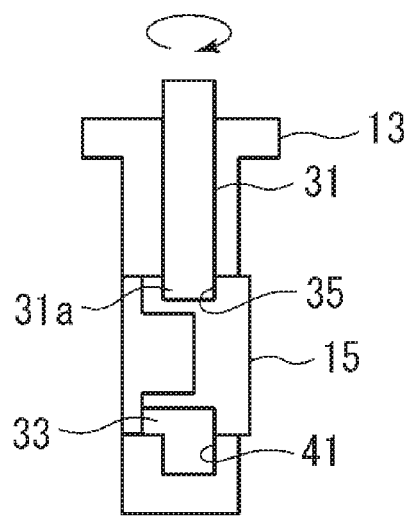
FIG. 8D is an explanatory view illustrating an assembling procedure of the valve body and the valve member of the butterfly valve shown in FIG. 1.
Figure 8E:
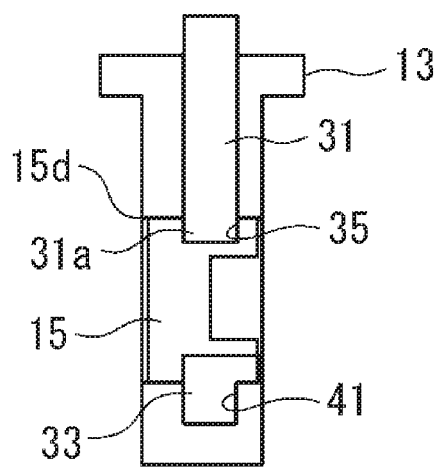
FIG. 8E is an explanatory view illustrating an assembling procedure of the valve body and the valve member of the butterfly valve shown in FIG. 1.

Next, as shown in FIG. 8D, the valve member 15 is rotated by 180° about the rotation axis R in the internal flow passage 13a, and, as shown in FIG. 8E, the valve member valve seat surface 15d of the valve member 15 is disposed to be directed to the side on which the seat ring 17 is mounted, i.e., the annular recessed portion 21 side. Thereafter, the seat ring 17 is attached to the annular recessed portion 21 by the seat retainer 19, so that the assembling of the butterfly valve 11 is completed.

Next, a detailed structure of the seat ring 17 and the seat retainer 19 of the butterfly valve will be further described with reference to FIG. 9.

As described above, the seat retainer 19 includes the retainer body 19a and the retainer cap 19b, and the surfaces of the inner peripheral edge ends of the retainer body 19a and the retainer cap 19b facing the internal flow passage 13a extend in a spherical shape at a predetermined distance apart from the spherical valve member valve seat surface 15d formed in the outer peripheral edge portion 15c of the valve member 15 in valve closing. The valve seat portion 17a of the seat ring 17 is configured to project and extend from the spherical surfaces of the inner peripheral edge ends of the retainer body 19a and the retainer cap 19b toward the internal flow passage 13a. Due to such a configuration, when the valve member 15 is rotated about the rotation axis R to be brought into a valve closed state, the valve seat portion 17a of the seat ring 17 projecting from the spherical surfaces of the inner peripheral edge ends of the retainer body 19a and the retainer cap 19b abuts against the valve member valve seat surface 15d of the valve member 15 to define a sealing plane, so that the internal flow passage 13a can be sealed. Furthermore, the spherical surfaces of the inner peripheral edge ends of the retainer body 19a and the retainer cap 19b are disposed at a predetermined distance apart from the spherical valve member valve seat surface 15d of the valve member 15 brought into the valve closed state, and therefore there is secured an escape space for the valve seat portion 17a of the seat ring 17 compressed to be laterally deformed due to contact with the valve member valve seat surface 15d of the valve member 15.

The annular valve seat portion 17a of the seat ring 17 has a triangular cross section and is formed such that a bisector 51 of a vertex angle in the triangular cross section of the valve seat portion 17a is perpendicular to a tangential line 49 to the spherical valve member valve seat surface 15d at a point where a vertex portion of the valve seat portion 17a and the valve member valve seat surface 15d of the valve member 15 in valve closing abut against each other. Such a shape of the valve seat portion 17a of the seat ring 17 makes the valve seat portion 17a come into contact with the valve member valve seat surface 15d in the same manner as when the valve member 15 is rotated in the valve closing direction and when the valve member 15 is rotated in the valve opening direction, thereby suppressing the occurrence of tilting. As a result, wear and breakage of the valve seat portion 17a can be reduced. When the angle of the vertex angle of the triangular cross section of the valve seat portion 17a decrease to about 90°, the tilting is likely to occur when abutting against the valve member valve seat surface 15d. Therefore, the angle is preferably set in the range of 100° to 150° and more preferably set in the range of 110° to 120°.

Moreover, the retainer cap 19b has an annular wall portion 53 projecting and extending in the direction of the flow passage axis from the annular cap body portion, so that, when the seat ring 17 is held between the retainer body 19a and the retainer cap 19b, the annular wall portion 53 is fitted in an annular fitting groove 55 provided in the fixing portion 17b of the seat ring 17. Such a structure makes it possible to obtain a sufficient sealing surface pressure by collapsing the valve seat portion 17a with a reaction force from the annular wall portion 53 of the retainer cap 19b fitted in the annular fitting groove 55 of the seat ring when the valve seat portion 17a of the seat ring 17 abuts against the valve member valve seat surface 15d of the valve member 15.

Figure 9:
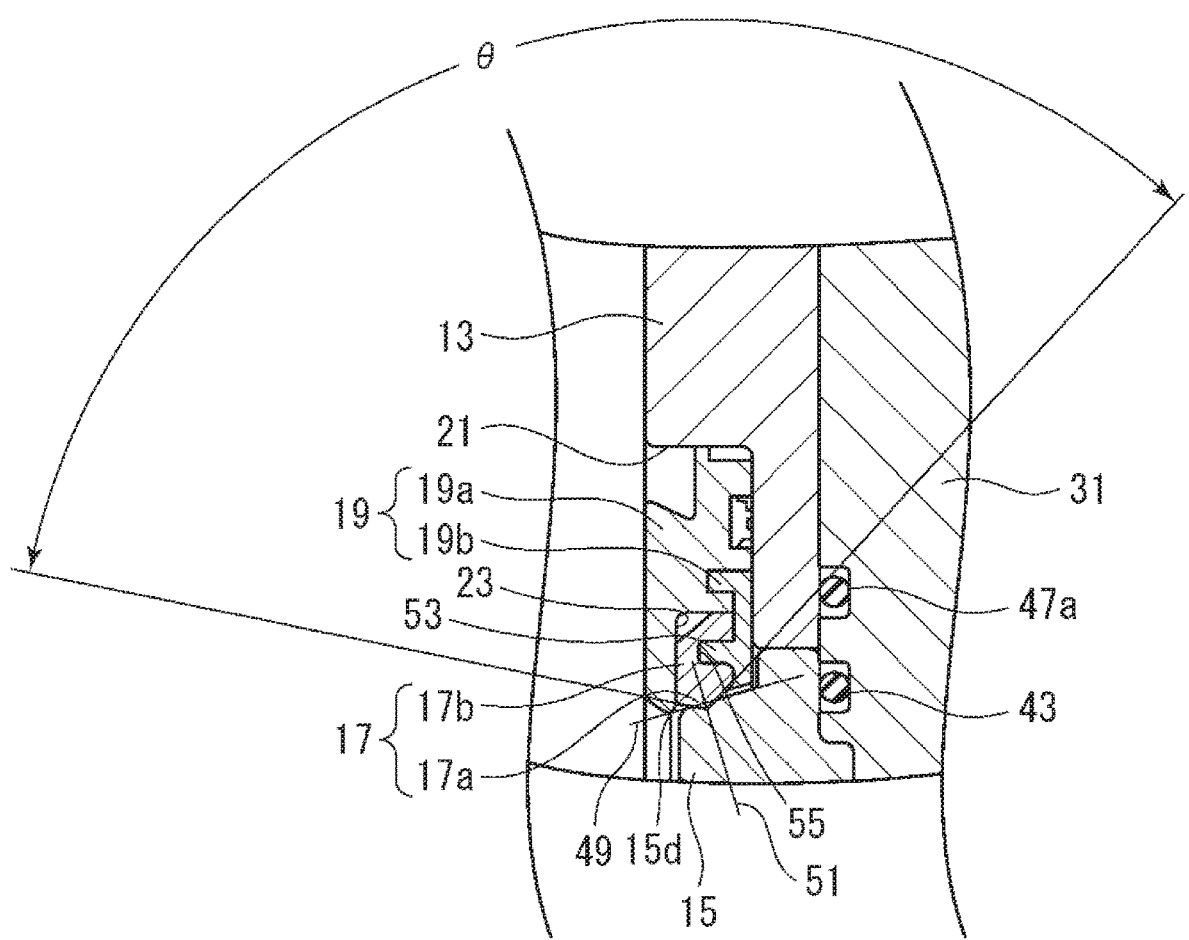
FIG. 9 is an enlarged view showing a detailed structure of a seat ring and a seat retainer of the butterfly valve shown in FIG. 1.
Figure 10:
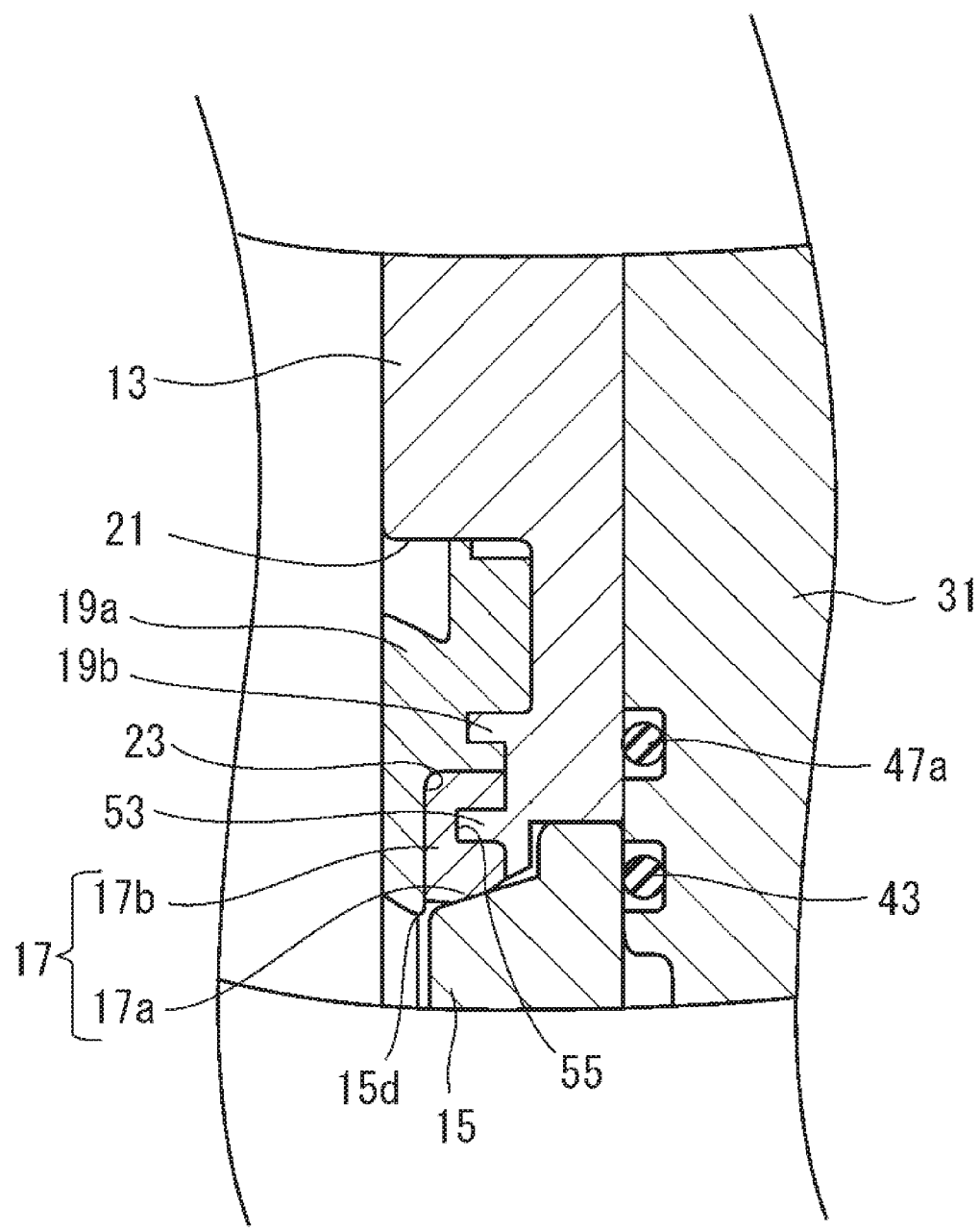
FIG. 10 is an enlarged view showing a variation of the butterfly valve shown in FIG. 1.

While the retainer cap 19b of the embodiment shown in FIG. 9 is shown as an independent component, the retainer cap 19b may be formed integrally with the valve body 13 as shown in FIG. 10. By forming the retainer cap 19b integrally with the valve body 13 as described above, the number of components can be reduced, so that a cost reduction can be achieved. Moreover, the number of portions where sealability is required can be reduced, and therefore a risk of the leakage to the outside can also be reduced. Furthermore, the assembly of the butterfly valve 11 is also facilitated.

While the butterfly valve 11 according to the present invention has been described above with reference to the embodiment shown in the figures, the present invention is not limited to the embodiment shown in the figures. For example, in the above-described embodiment, the groove portion 25 is provided in the valve member 15. However, the present invention is also applicable to a butterfly valve provided with the valve body 15 which is not provided with the groove portion 25. In the the above-described embodiment, the present invention has been described based on the embodiment in which the present invention is applied to the double eccentric butterfly valve 11. However, the application of the present invention is not limited to the double eccentric butterfly valve and the present invention may be applied to a single eccentric butterfly valve or a multiple eccentric butterfly valve other than a double eccentric butterfly valve.

DESCRIPTION OF REFERENCE NUMERALS 11 butterfly valve
13 valve body
13a internal flow passage
15 valve member
15c outer peripheral edge portion
15d valve member valve seat surface
17 seat ring
17a valve seat portion
19 seat retainer
19a retainer body
19b retainer cap
49 tangential line
51 bisector
53 annular wall portion
55 annular fitting groove

The invention claimed is:

1. A butterfly valve comprising a valve body formed therein with an internal flow passage extending in a direction of a flow passage axis, a disk-shaped valve member supported in the internal flow passage to be rotatable about a rotation axis perpendicular to the flow passage axis and having a spherical valve seat surface in an outer peripheral portion, an annular recessed portion formed so as to surround the internal flow passage on the side surface of a valve body in a direction of the flow passage axis, and an annular seat ring having a valve seat portion in an inner peripheral edge portion thereof and attached to the annular recessed portion such that the valve seat portion projects into the internal flow passage, said internal flow passage being opened and closed by rotating the valve member to bring the valve seat surface into and out of contact with the valve seat portion of the seat ring, wherein the valve seat portion has a triangular cross section and is formed such that a bisector of a vertex angle in the triangular cross section of the valve seat portion is perpendicular to a tangential line to the valve seat surface at a point where a vertex of the valve seat portion and the valve seat surface abut against each other.

2. The butterfly valve according to claim 1, wherein the butterfly valve further comprises a retainer cap and a retainer body, and the annular recessed portion has a recessed portion wall surface extending perpendicularly to the flow passage axis, said seat ring being held in the annular recessed portion by holding the seat ring between the retainer cap disposed on the recessed portion wall surface and the retainer body fixed to the annular recessed portion such that the valve seat portion projects to the internal flow passage side.

3. The butterfly valve according to claim 2, wherein an inner peripheral surface configured by the surfaces, facing the internal flow passage, of the retainer body and the retainer cap is formed so as to extend in parallel with and apart from the valve seat surface of the valve member in valve closing.

4. The butterfly valve according to claim 2, wherein the retainer cap includes an annular cap body portion and an annular wall portion projecting and extending in the direction of the flow passage axis from the cap body portion, and the seat ring is held between the retainer cap and the retainer body in a state where the annular wall portion is fitted in an annular fitting groove provided in the seat ring.

5. The butterfly valve according to claim 3, wherein the retainer cap includes an annular cap body portion and an annular wall portion projecting and extending in the direction of the flow passage axis from the cap body portion, and the seat ring is held between the retainer cap and the retainer body in a state where the annular wall portion is fitted in an annular fitting groove provided in the seat ring.

6. The butterfly valve according to claim 1, wherein the vertex angle in the triangular cross section of the valve seat portion of the seat ring is in the range of 110° to 120°.

7. The butterfly valve according to claim 2, wherein the vertex angle in the triangular cross section of the valve seat portion of the seat ring is in the range of 110° to 120°.

8. The butterfly valve according to claim 3, wherein the vertex angle in the triangular cross section of the valve seat portion of the seat ring is in the range of 110° to 120°.

9. The butterfly valve according to claim 4, wherein the vertex angle in the triangular cross section of the valve seat portion of the seat ring is in the range of 110° to 120°.

10. The butterfly valve according to claim 5, wherein the vertex angle in the triangular cross section of the valve seat portion of the seat ring is in the range of 110° to 120°.

11. The butterfly valve according to claim 2, wherein the retainer cap and the valve body are integrally formed with each other.

12. The butterfly valve according to claim 1, wherein the rotation axis is set to be located eccentrically in a direction of the flow passage axis from the valve seat surface and located eccentrically from the center of the internal flow passage.

* * * * *